Feb. 19, 1929.
P. J. ROSSMAN
1,702,318
CLAIM CHECK FOR PARKING STATIONS
Filed Feb. 23, 1928
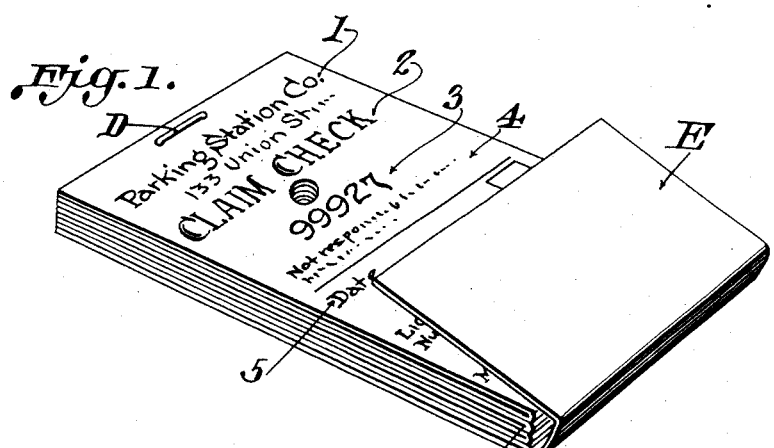
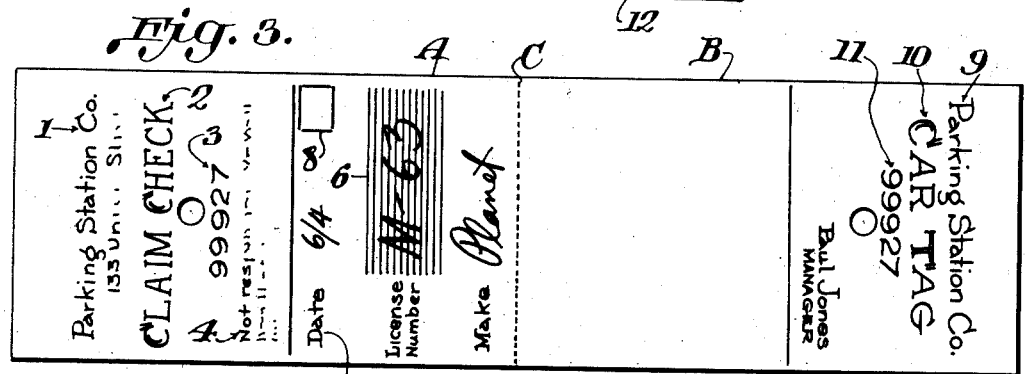
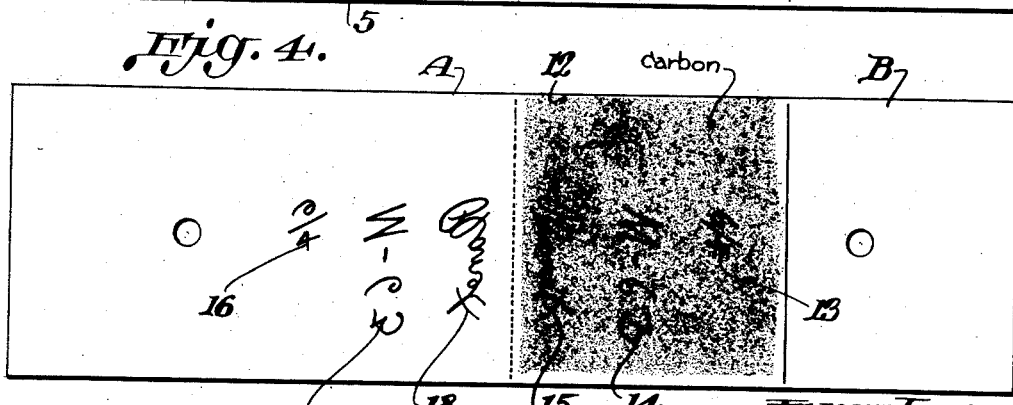

Patented Feb. 19, 1929.

1,702,318

UNITED STATES PATENT OFFICE.

PAUL J. ROSSMAN, OF MILWAUKEE, WISCONSIN, ASSIGNOR TO BADGER AUTO SERVICE COMPANY, INC., OF MILWAUKEE, WISCONSIN, A CORPORATION OF WISCONSIN.

CLAIM CHECK FOR PARKING STATIONS.

Application filed February 23, 1928. Serial No. 256,384.

This invention relates to a particular form of claim check and car tag to be used in connection with the parking of automobiles or for similar purposes. It has been found that in connection with previous forms of tags, there is a possibility of the used tags and checks being collected by a dishonest employee and resold to other customers. It has been found somewhat difficult to devise simple and efficient means for preventing such a practice.

The present claim check and car tag is a very simple and efficient device which will absolutely prevent such dishonest practice as referred to above or if an attendant endeavors to resell a used check the fact will be ascertained and the party responsible therefor readily identified.

In the drawings:

Figure 1 is a perspective view of a book of blank checks and tags comprising the subject matter of the invention.

Figure 2 is an edge view thereof.

Figure 3 shows a face view of the check and tag when filled out but still connected.

Figure 4 is a rear view of the check and tag filled out but still connected.

The invention comprises a claim check A and a car tag B formed of a single piece of paper, and a series of these are folded along the line C and stapled together as indicated at D. The back of the book may be composed of a separate piece of paper having a flap E which protects the folded ends and covers the lower half of the front of the claim check in order to protect the same.

The front of the claim check A will contain a designation 1 of the parking station, identifying data 2 showing that it is a claim check, a serial number 3, and any suitable printed matter 4 in the nature of instructions to the holder of the check. This matter will preferably occupy the upper half of the claim check.

The lower half of the claim check on the face thereof will contain suitably identified spaces 5, 6 and 7 for the date, license number, and make of machines, respectively. The space 6 in which the license number is written is provided with a plurality of fine printed lines which render it practically impossible to erase the number written and substitute another number without immediate detection. There is also a space 8 in which a cross or other identifying data may be placed if the car is of foreign registration.

The face of the car tag which is affixed to the car, contains the designation of the parking station 9, a notation 10 indicating that this part is a car tag, and the serial number 11 which of course corresponds to the serial number 3 on the face of the claim check.

The lower half of the car check which immediately underlies the lower half of the claim check upon which the above mentioned data is written, is carbonized at 12 and when the data is written on the front of the claim check it will also appear upon this carbonized portion of the car tag. The date will show at 13, the license number at 14, and the make of the car at 15. It is obviously impossible for the attendant to erase this matter from the carbonized sheet.

At the same time the data in reflected form will appear on the back of the claim check, as a carbon copy.

It is obvious that with this construction of claim check and car tag it is impossible for the checks to be resold without immediate detection. The data appearing on the carbonized portion of the car tag cannot be changed and the data appearing in reflected form as a carbon copy on the back of the claim check could not be successfully erased and other data written in its place. Moreover, the construction is very simple, embodying only two parts which may be printed as a unit and folded into book form. It is obvious that such checks may be employed for other purposes than checking automobiles and it is also obvious that minor detail changes may be made without in any way departing from the spirit of the invention. It is therefore to be understood that the invention is to be regarded as limited only by the scope of the appended claims.

I claim as my invention:

1. A claim check and tag comprising two parts disposed in overlying relation, a part of the face of the claim check carrying suitably identified spaces for the entry of appropriate data, and the opposite part of the rear of the tag being carbonized so that the data written on the face of the claim check appears on said carbonized portion of the tag, and also as a carbon copy in reflected form on the back of the claim check.

2. A claim check and tag comprising two parts disposed in overlying relation, the claim check having an appropriately designated space for the entry of data, the opposing portion of the rear face of the tag being provided with transfer means so that data written on the face of the claim check will appear on the said portion, and also as a copy in reflected form on the back of the claim check.

In testimony whereof, I have hereunto subscribed my name.

PAUL J. ROSSMAN.